Figure 1:
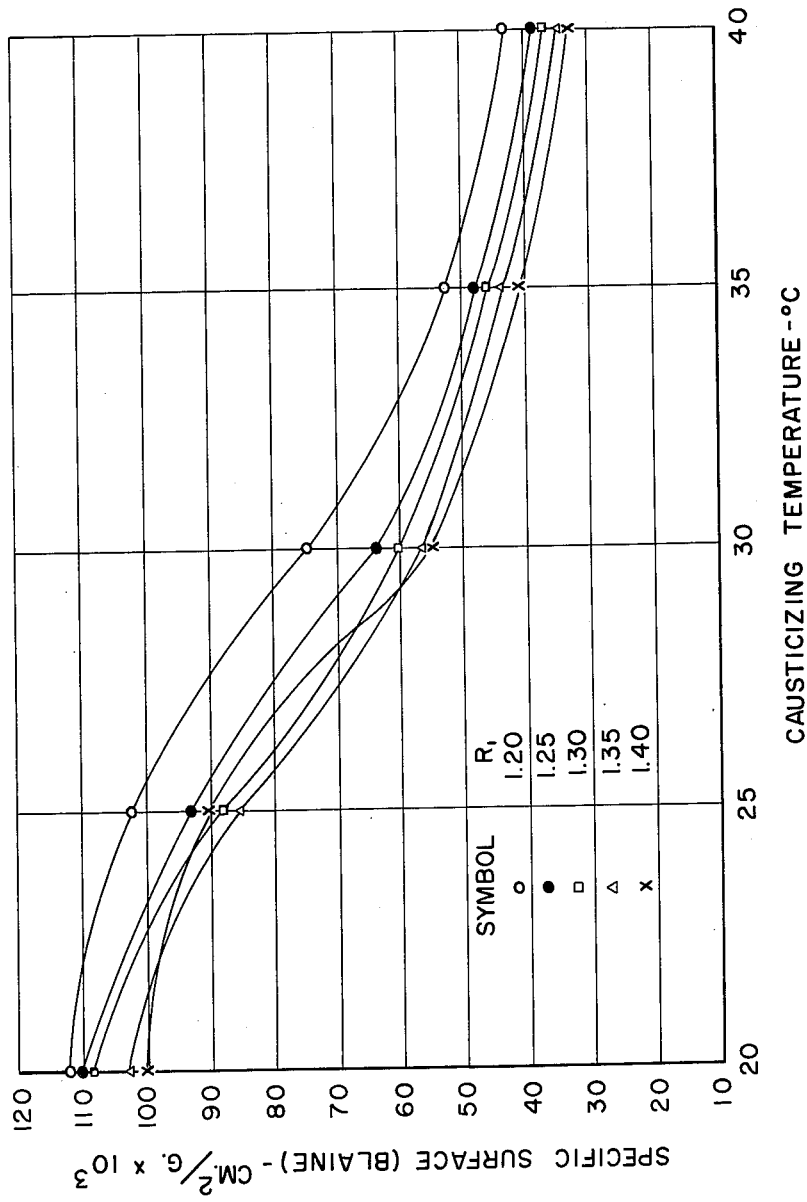

United States Patent Office 2,979,380
Patented Apr. 11, 1961

2,979,380

CARBONATE MANUFACTURE

Thomas C. Miller, Tonawanda, N.Y.

Filed Nov. 28, 1958, Ser. No. 776,878

12 Claims. (Cl. 23—66)

This invention relates to the preparation of uniform fine particles of calcium carbonate. The invention is particularly adapted to the preparation of a fine carbonate for paper coatings and the simultaneous preparation of sodium hydroxide for use in pulp preparation, however, it is not the intention to be limited to this specific application. Uses of the fine powder of the present invention will also include manufacture of rubber, plastics, cosmetics, and other manufactures requiring fine fillers, extenders, etc. This application is a continuation-in-part of my copending application Serial No. 597,516, filed July 12, 1956, now abandoned.

The causticizing of $Na_2CO_3$ with $Ca(OH)_2$ is carried out in various ways, depending upon the end use for the NaOH liquor and/or the $CaCO_3$ presipitate. The soda pulp and the sulphate (kraft) pulp industries interested only in the NaOH liquor presently execute the causticization with warm or hot solutions of $Na_2CO_3$ and suspensions of $Ca(OH)_2$. The precipitate produced under these conditions is separated by sedimentation and either reclaimed by reburning or wasted through the sewer. Soda plants interested in a coating material generally operate a separate division for the preparation of precipitated $CaCO_3$ in which hot suspensions of $Ca(OH)_2$ are used to causticize hot solutions of $Na_2CO_3$. The latter process requires first stage filtration by vacuum, resuspension of the precipitate in hot $H_2O$ followed by recausticizing with hot $Na_2CO_3$ and refiltering (second stage) the precipitate to obtain complete removal of $Ca(OH)_2$ as $CaCO_3$. The precipitate for coating must not contain any free $Ca(OH)_2$, hence the necessity for two-stage causticizing.

The warm or hot causticization of $Na_2CO_3$ presents two objectionable features. First, precipitates of $CaCO_3$ constant in particle size distribution or specific surface are difficult to obtain apparently because of variations in temperature and concentration of the reagents and second, a resuspension and recausticization of the $CaCO_3$ precipitate further complicates the particle size distribution by promoting agglomeration. Agglomerated particles produced in this manner are very difficult to redisperse as individual particles even at extremely high speed agitation or high energy dispersion.

Cold causticization in the range of 20° C. to 75° has been previously discussed very broadly, for example, U.S. Patent 2,062,255, issued November 24, 1936, wherein a recognition is made of the relatively finer $CaCO_3$ particle size produced thereby. Cold causticization has not, however, replaced the warm causticization process due to certain other even more objectionable features. Of prime importance is the lack of recognition, heretofore, of a cold causticization process susceptible to a commercially suitable rate of separation of precipitate. Separation by sedimentation of the very fine particle precipitates is far too slow for commercial practicability. Filtration of the precipitate of cold causticization has been impractical due to the lack of a product of suitable uniform particle size distribution and method for producing the same.

It is an object of the present invention to provide a method of producing precipitates of $CaCO_3$ by cold causticization, which method avoids the above mentioned objectionable features, and produces, in highly reproducible form, a precipitate of $CaCO_3$ of unusually uniform particle size, that is, precipitates of unusually narrow particle size distribution, which method is, further, subject to controllable variation in a relatively wide range of selective fine particle sizes.

It is a further object of the invention to provide an improved, extra fine $CaCO_3$ powder of superior characteristics heretofore unavailable.

Figure 2:
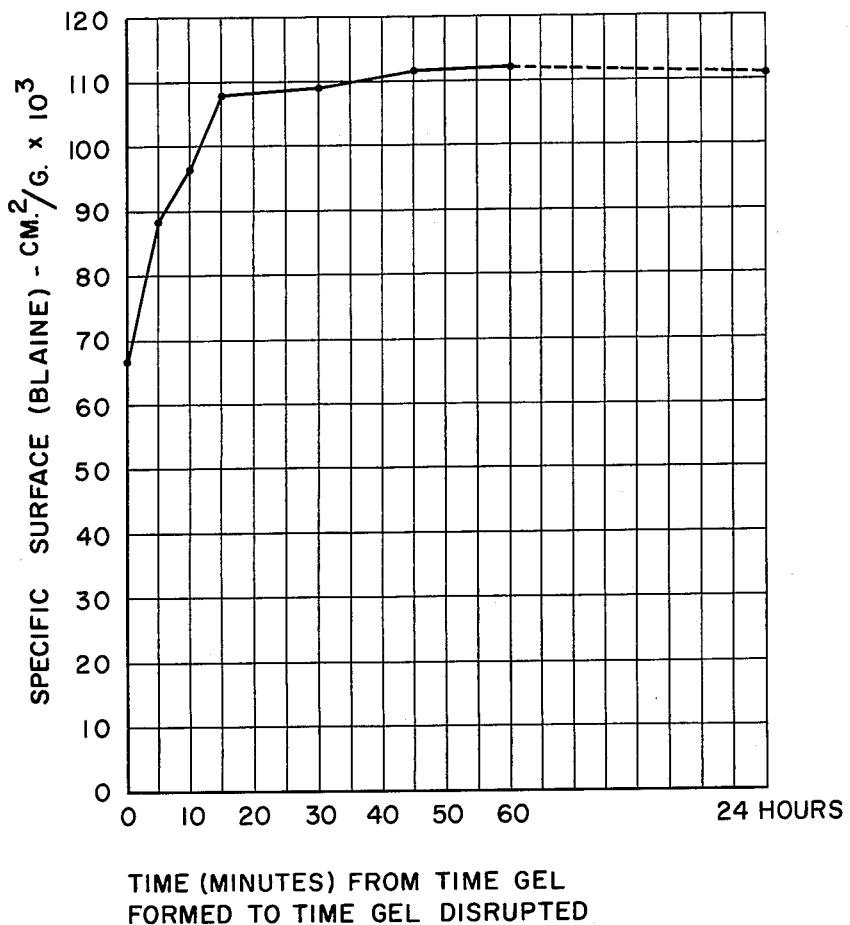

These and other objects of the invention will be more readily apparent when considered in relation to the preferred embodiments as set forth in the specification and further disclosed in the drawings, in which Fig. 1 is a graphic representation of specific surface of the products, embodying the invention, in relation to the temperature of causticization, at various ratios of reactants, all in accordance with the process of the invention, and Fig. 2 is a graphic representation of specific surface of the products, embodying the invention, in relation to the time of gel maintenance.

The cold causticization of the present invention involves, generally, the addition of a solution of $Na_2CO_3$ to a suspension of $Ca(OH)_2$, each at substantially the same temperature, at some point between 20° and 40° C. The $Na_2CO_3$ solution is added in a very short length of time, or during a specified time. Controlled mild, but thorough, agitation of the mixed chemicals is maintained throughout the reaction until a gel begins, at which time the agitation is stopped. The gelled mixture is then allowed to stand until the reaction has proceeded to convert about 90% of the $Na_2CO_3$ to NaOH. The gelled mass is then dispersed by agitation and the suspension of $CaCO_3$, in NaOH solution is filtered by vacuum to remove the NaOH. The precipitate of $CaCO_3$ contains some $Ca(OH)_2$ because the reaction is not complete in strong NaOH solutions or when insufficient $Na_2CO_3$ is present. But, the $Ca(OH)_2$ is converted to $CaCO_3$ by washing this precipitate in filter cake form with a solution of $Na_2CO_3$ maintained at the same temperature at which the causticization was originally carried out. The precipitate of $CaCO_3$ is then washed with fresh water until it is free of alkali. The precipitate will be found to be free of $Ca(OH)_2$.

EXAMPLE I

A typical causticization, in accordance with the invention, may be made with 1000 ml. of $Ca(OH)_2$ suspension of 175 g.p.l. (grams per liter) and 1000 ml. of $Na_2CO_3$ of 200 g.p.l. The $Ca(OH)_2$ suspension is first sieved through a sieve, of from 100 to 250 mesh, to remove impurities. The $Na_2CO_3$ solution is then added substantially all at once to the 1000 ml. of $Ca(OH)_2$ suspension, both being at 20° C., in a 3 liter beaker, 8 inches in diameter, and agitated with a two-arm cross-stirrer operated at 140 r.p.m.

EXAMPLE II

The 20° C. $Na_2CO_3$ solution may alternatively be added to the 20° C., $Ca(OH)_2$ suspension through an orifice, delivering the 1000 ml. of $Na_2CO_3$ solution of Example I in approximately 12–14 minutes, while the $Ca(OH)_2$ suspension is agitated at 140 r.p.m. The reaction, maintained throughout at 20° C., will be completed sufficiently to form a pseudo-gel in approximately 20 minutes, plus or minus 3 minutes, from the time the first $Na_2CO_3$ is added to the $Ca(OH)_2$.

EXAMPLE III

For a reaction with the chemicals maintained at 40° C., the $Na_2CO_3$ solution may be added through an orifice tube, delivering the 1000 ml. in not more than 2 minutes, the conditions otherwise being as defined in Example I. The gelling will be found to take place in approximately 4 minutes from the time the first $Na_2CO_3$ is added to the $Ca(OH)_2$ at this temperature.

Continuing the process of each of the above examples, agitation is stopped at the moment gelling begins. This gelled suspension is allowed to remain undisturbed until the reaction has converted approximately 90% of the $Na_2CO_3$ to NaOH. The time required for sufficient effect of the reaction in the gelled suspension condition, in order to obtain a definite marked improvement in the resultant $CaCO_3$ in accordance with the invention, is about fifteen minutes. In the present example of the invention the suspension is maintained in the gelled condition a period of about one to one and one-half hours. Any additional time allowed at this step of the process, even several days, has been found to have no measurable technical disadvantages.

The gel is dispersed by agitation when the reaction has reached the desired efficiency and the suspension is filtered through a vacuum filter. In the methods of the Examples I to III above, a standard 4½ inch Oliver-United test filter leaf was employed. The filter leaf was provided with a nylon filter cloth and operated under a vacuum of 24" of Hg. The assembled filter was placed in the suspension at the required vacuum and operated for exactly one minute. Filter cakes of approximately 1¼ inches were obtained from the suspensions of the 20° C. reactions of Examples I and II, and filter cakes of approximately ¾ inch were obtained from the suspension of the 40° C. reaction of Example III.

The precipitated $CaCO_3$, containing some $Ca(OH)_2$, is washed with 1000 ml. of a $Na_2CO_3$ solution at a concentration of 100 g.p.l. and at a temperature of the causticization. The precipitate is finally washed with fresh water until free of alkali, or until 10 ml. of the filtrate requires not more than 1 drop of N. HCl to neutralize it to methyl orange indicator. Not more than three volumes of fresh water will be required for each volume of dispersed suspension to complete this washing.

The $Na_2CO_3$ wash solution will be converted to a NaOH solution of approximately the same concentration as the white liquor, with which it is combined as white liquor. The $CaCO_3$ precipitate will be found to be substantially free of $Ca(OH)_2$.

EXAMPLE IV

Commercial volumes of $CaCO_3$ may be prepared by slaking 3680 pounds of quicklime (CaO) in 3500 gallons of water, or water containing as much as 4 g.p.l. NaOH, to produce a suspension of $Ca(OH)_2$ which is subsequently sieved through from a 100 mesh to 250 mesh sieve to remove impurities. The sieved suspension will contain 175 g.p.l. (1.46 p.p.g. or pounds per gallon) $Ca(OH)_2$ when cooled to room temperature. The suspension of $Ca(OH)_2$ is cooled to some temperature between 20° C. and 40° C., in the present example 25° C. A 3000 gallon $Na_2CO_3$ solution at a concentration of 258 g.p.l. (2.15 p.p.g.) and at the same 25° C. temperature, is pumped in 12 minutes into an eleven foot diameter tank containing the $Ca(OH)_2$, while the mixture is continuously agitated by an eleven foot diameter two-arm cross-stirrer, rotated at a speed of 9 r.p.m. Gelling occurs in approximately 20 minutes after the first $Na_2CO_3$ is added to the $Ca(OH)_2$. The gelled mixture is allowed to remain undisturbed for approximately 1½ hours. The gel is then dispersed by agitation and the liquor filtered by vacuum filtration.

The precipitate is then washed with 3000 gallons of water containing 100 g.p.l. (0.83 p.p.g.) $Na_2CO_3$ to convert any remaining $Ca(OH)_2$ to $CaCO_3$. Finally, the precipitate is washed with fresh water until the filtrate is free of alkali.

The $Na_2CO_3$ wash liquor will be found to have a concentration of NaOH equivalent to white liquor and consequently can be combined with the original NaOH filtrate as cooking liquor in the pulp industry.

The precipitate consists of particles of uniform diameter $CaCO_3$ having a specific in the order of 79,000 cm.$^2$/g. and is, for all practical purposes, free of $Ca(OH)_2$.

Specific surface measurements of $Ca(OH)_2$ and $CaCO_3$ powder included herethroughout have been obtained with the Blaine air permeability apparatus (ASTM C204–50).

EXAMPLE V

In the preceding examples the gel was maintained for approximately one to one and one-half hours. In the present example suspensions formed according to either Examples I or II, are allowed to form a pseudo-gel maintaining quiescence for fifteen minutes, agitation being stopped the moment gelling begins. When the gel has been maintained undisturbed for a period of about fifteen minutes, the reaction will have converted almost 90% of the $Na_2CO_3$ to NaOH and substantially all of the $CaCO_3$ will have been formed in accordance with the invention.

The gel is then dispersed by agitation and the suspension is filtered and washed as described in Example III.

$Ca(OH)_2$ preparation

The most important prerequisite for a suitable calcium carbonate precipitate is the type or quality of CaO used to produce a suspension of high quality $Ca(OH)_2$. The lime (CaO) must be capable of producing small diameter particles or a high specific surface $Ca(OH)_2$. The highest specific surface $Ca(OH)_2$ is obtained when CaO is slaked in an excess of water, in the order of 6 or 7 parts by weight of water to one part CaO, at or near 100° C., because maximum activity between water and lime is thus obtained to "explode" particles into minimum dimensions. Aged or air-slaked lime or improperly calcined lime will not attain sufficient fineness and, consequently, will not be suitable for producing the coating carbonate, in accordance with the invention. A CaO suitable for coating-grade $CaCO_3$ should develop a $Ca(OH)_2$ of not less than 48,000 cm.$^2$/g. surface. The $Ca(OH)_2$ specific surface is determined with the Blaine apparatus by making five separate charges of the powder making up the total sample, to provide even compression throughout the sample.

A simple quantitative test for the evaluation of a pebble lime consists of slaking 117.6 gm. of the CaO in 900 ml. $H_2O$ at 24° C. in an insulated stainless steel beaker while stirring at 500 r.p.m. with a type of stirrer producing vigorous agitation. The temperature rise in the suspension at 30 seconds and at the time to reach a maximum temperature produced by the slaking of the CaO is recorded. The criterion of a suitable lime to produce a good $Ca(OH)_2$ is that the temperature rise at least 28° C. by 30 seconds and at least 45° C. at the maximum temperature.

It has been found that the ratio of $Ca(OH)_2$ to $Na_2CO_3$ is very important and critical in developing a pigment $CaCO_3$ of desired specific surface, uniform particle size, and other physical properties in accordance with the invention. It is necessary to accurately determine the quantity of $Ca(OH)_2$ in suspension chemically, by the sugar method or otherwise, and maintain the quantity in definite proportion to the water present.

The $Ca(OH)_2$ concentration is most satisfactory at approximately 175 g.p.l. (1.47 p.p.g.) to 194 g.p.l. (1.62 p.p.g.) corresponding to a $H_2O$ to $Ca(OH)_2$ weight ratio of approximately 4.7 to 4.15. These weight ratios correspond to a $H_2O$ to $CaO$ weight ratio of approximately 5.6 to 6.3. More concentrated suspensions cannot be satisfactorily screened through the customary screen cloth to remove impurities. And, the use of more diluted suspensions in the process of the invention produce liquors low in NaOH. The important factor establishing this ratio is the control of particle size and the filtering efficiency of $CaCO_3$, produced from it in accordance with the invention.

A chemical analysis of the $Ca(OH)_2$ suspension is essential in determining the critical amount of $Na_2CO_3$ required in the process of the invention. This $Ca(OH)_2$ analysis is readily accomplished by treating 5 ml. of the suspension in 10 ml. of water with 25 ml. of a 50% solution of cane sugar. After 10 minutes, the mixture is titrated with normal HCl to a phenolphthalein end point. The quantity of acid required multiplied by 7.41 will give the concentration of $Ca(OH)_2$ in grams per liter of suspension. A concentration in grams per liter may be divided by 119.8 to give the concentration in pounds per gallon.

The raw material source for the $Ca(OH)_2$ of the present process has been found to be not critical for practicing in accordance with the invention, however, a high calcium lime is clearly preferable and advantageous and has been used for obtaining all data disclosed herein. When a high magnesia lime hydrate or dolomitic lime hydrate is used in the process of the invention, all proportions taught herethroughout should be based upon the $Ca(OH)_2$ portion only of the hydrate. With regard to the precipitation reaction under the conditions of the novel process, the balance of the hydrate, in the form of $MgO$ or $Mg(OH)_2$, has been found to be apparently relatively inactive. The presence of the $MgO$ or $Mg(OH)_2$ does not inhibit the reaction of the prescribed ingredients in their normal manner as herein set forth other than to reduce the resultant specific surface of the product generally in proportion to the ratio in which the $MgO$ or $Mg(OH)_2$ is present in the hydrate.

$Na_2CO_3$ preparation

The concentration of $Na_2CO_3$ solutions should be as high as practically possible to produce a high concentration of NaOH in the resulting liquor. Regardless of the low efficiency of concentrated solutions of $Na_2CO_3$ and suspensions of $Ca(OH)_2$, it is desirable in most cases to maintain high concentrations and to overcome the low efficiency by other provisions in the process. The solubility of $Na_2CO_3$ in water between 20° C. and 40° C. is then the only factor governing the possible concentration of a solution. Naturally, a solution of $Na_2CO_3$ should contain no solid phase, else the possible presence of $Na_2CO_3 \cdot 10H_2O$ will interfere with the reaction.

Theoretically, a saturated solution of $Na_2CO_3$ at 20° C. contains 213.5 g.p.l. (1.78 p.p.g.) $Na_2CO_3$. The concentration of the solution at this temperature, in accordance with the invention, should be maintained at approximately 200 g.p.l. to 210 g.p.l. to avoid the presence of a solid phase. Preferred concentrations will be higher at higher temperatures, in accordance with the invention, increasing to approximately 429 g.p.l. at 40° C.

The actual concentration of $Na_2CO_3$ in a solution for reaction should be determined by titration to accurately proportion the reagents. A sample of 10 ml. of the solution titrated with N. HCl to methyl orange indicator and the titration multiplied by 5.3 will give the concentration in grams per liter.

While a concentration of 200 g.p.l. to 210 g.p.l. $Na_2CO_3$ may be sufficient to produce the desirable quality of $CaCO_3$, it may be desirable to provide a greater weight of $Na_2CO_3$ to increase the concentration of a resulting NaOH solution (white liquor). The presence of $Na_2CO_3 \cdot 10H_2O$ in the $Na_2CO_3$ solution is detrimental to the proper gelling and crystallization of $CaCO_3$ of the proper particle size and therefore the solubility of $Na_2CO_3$ limits the maximum concentration. However, when it is desirable to increase the concentration at low temperatures, it may be accomplished by adding dry $Na_2CO_3$ to a causticized suspension before gelling has taken place. The total volume of water from the $Na_2CO_3$ solution and the $Ca(OH)_2$ suspension then provides ample liquid for the solution of this additional $Na_2CO_3$ without the formation of $Na_2CO_3 \cdot 10H_2O$.

Causticization reaction

The common reaction between $Ca(OH)_2$ and $Na_2CO_3$ is not a simple one. A NaOH solution is produced from the reaction and, because of its high ionization, the reaction tends to be reversed so that generally the efficiency of the reaction is 90% complete. Diluted solutions of $Na_2CO_3$ and diluted suspensions of $Ca(OH)_2$ produce a more complete reaction, but the concentration of the resulting NaOH solution is far too low to be of commercial value in many industries including pulp and paper. In present day commercial practices, this reaction is usually carried out at high temperatures in the order of 100° C. More concentrated solutions of $Na_2CO_3$ and more concentrated suspensions of $Ca(OH)_2$ are generally reacted at such high temperatures in a single reaction when the presence of $Ca(OH)_2$ in the precipitate is not objectionable. Or, the reaction is carried out at the high temperature aiming for maximum conversion followed by a second reaction of the precipitate with a second solution of $Na_2CO_3$ to remove all $Ca(OH)_2$ from the precipitate as $CaCO_3$ when $Ca(OH)_2$ is objectionable. Maximum conversion of $Na_2CO_3$ to NaOH and $Ca(OH)_2$ to $CaCO_3$ in these reactions has been obtained when the $Ca(OH)_2$ is approximately 10 percent in excess. Neither of these reactions consistently produce a precipitate of uniform particle side or high filtering efficiency because of the high temperatures and because of the resuspension and recausticization. This causticization reaction has, however, now been carried to approximately 96% with the present cold method of causticizing.

Inorganic reactions generally take place almost instantaneously at room temperature. They are accelerated at higher temperatures (near boiling—100° C.), but it is a well-known phenomenon in analytical chemistry that boiling accelerates the formation of larger particles by agglomeration. This is analogous to a causticization reaction carried out at higher temperatures. The formation of agglomerates produces particles of various sizes over a wide range so that maximum density results from maximum packing. The settling rate of agglomerated particles is usually very high, but the filtering rate is so poor that the precipitate cannot be washed free of alkali. Accordingly, the formation of agglomerated particles in the process of the invention must be avoided.

The rate of reaction between the $Ca(OH)_2$ and $Na_2CO_3$ is preferably controlled in such a way that the reaction will not be completely instantaneous, but will take place in an orderly fashion to govern the size of particles predominant in a definite size range. The object of such a reaction would be to produce particles of substantially uniform diameter with a minimum of particles finer or coarser than the average-sized particles. The particles being more or less of uniform size would not correspond with the probability curve for particles covering a wide range of sizes. Particles of more or less uniform size pack into a bed with a maximum of void space (minimum of packing) to offer the least resistance to the passage of liquids. Therefore, the filter rate of such a bed of particles will be very high.

The reaction between $Ca(OH)_2$ suspensions and $Na_2CO_3$ in accordance with the process of the invention results in a pseudo-gel of good stability. These gels are produced after various lengths of time of mixing depending upon the temperature of the reagents between 20° C. and 40° C. The reaction at 20° C. produces a gel in approximately 25 minutes after the chemicals have been combined, while the reaction at 40° C. produces a gel in approximately 4 minutes. Controlled temperatures between these limits produces gels at proportionally corresponding times. The particle size, as determined by the Blaine air-permeability method, varies inversely as the time elapsed before gelling, the longer the gelling time, the finer the carbonate produced, and the shorter the gelling time, the coarser the carbonate. When the reagents are combined in the proper proportions, sufficiently before the gel time, the reaction has been found to produce a gel uniformly throughout a mass, regardless of size, at the proper time. When gelling begins, the reaction is spontaneous and only a few seconds are required for complete solidification of the mass to such a consistency that a motor-stirrer can be stalled or stopped. Under controls of temperature, concentration, chemical ratio and agitation the time for gelling between 20° C. and 40° C. can be consistently reproduced. The particle size or specific surface being governed by the gel time is also a function of temperature so that the specific surface is dependent upon temperature of the reaction.

A study of the development of $CaCO_3$ precipitates at temperatures above 40° C. has been made. Although the specific surface of carbonate precipitates continue to decrease with an increase in temperature from 40° C. to 100° C. (see Table VII), the gelling phenomenon does not occur at 50° C. and above. Most likely, the absence of the gelling characteristics at these temperatures above 40° C. is the result of an almost immediate or instantaneous gelling upon the instantaneous mixing of the reagents which would be overlooked or otherwise occur unnoticed even at gentle agitation. The decrease in gelling time from approximately 25 minutes at 20° C. to approximately 4 minutes at 40° C. indicates the approach to an instantaneous gelling time slightly above 40° C. The successful production of high specific surface carbonates depend upon the development of gels at various temperatures for consistently producing a reproducible specific surface at these temperatures. The gels must be allowed to form without interference from excessive agitation and, where thickening or gelling does not occur, control of constant specific surface is less likely.

The reaction between $Ca(OH)_2$ and $Na_2CO_3$ can be controlled to produce a gel of maximum specific surface and minimum uniform particle size diameter by maintaining a definite excess of $Ca(OH)_2$. As stated above, the reaction between $Ca(OH)_2$ and $Na_2CO_3$ reaches a maximum of approximately 90 percent because of the high ionization of the NaOH produced. The reaction may be improved by an excess of $Ca(OH)_2$ over the stoichiometric requirement. This is generally maintained at approximately 10 percent excess CaO in prior warm causticization processes. It was found, in accordance with the present invention, that definite excesses must be present if the $Ca(OH)_2$ is to act not only as an improvement to the chemical efficiency, but also as a "catalyst" in assisting in the control of the specific surface of particle diameter. A definite excess of $Ca(OH)_2$ provides an efficiency of up to approximately 96 percent, and prevents a premature reaction between the $Ca(OH)_2$ and $Na_2CO_3$ until the crystals of $CaCO_3$ form, at the instant of proper gelling. $Ca(OH)_2$ must be present in the amount of at least 2% over the stoichiometric amount to achieve favorable results, and it may be present to the extent of 40 percent in excess of stoichiometric amount without effecting maximum specific surface. The excess $Ca(OH)_2$ present in the precipitate is not detrimental to the quality of the $CaCO_3$ because it can be subsequently reacted with a wash solution of $Na_2CO_3$ at the original reaction temperature to convert it to $CaCO_3$. Therefore, $Ca(OH)_2$ in excess of the amount required for stoichiometric reaction improves the chemical and physical efficiency of the process and can be subsequently converted 100 percent to useful $CaCO_3$.

The optimum reaction between $Ca(OH)_2$ and $Na_2CO_3$ takes place when the reagents are maintained at a weight ratio of $Na_2CO_3/Ca(OH)_2$ of approximately 1.20. The weight ratio for theoretical proportions of $Na_2CO_3$ and $Ca(OH)_2$ is 106/74.1 or 1.43. It is necessary to maintain an excess of $Ca(OH)_2$ to develop the $CaCO_3$ at a maximum specific surface, and therefore the practical ratio will be less than 1.43. It has been found that within limits this optimum ratio is from 1.00 to 1.40. Table I illustrates the amount of reagents for laboratory procedures when the weight of $Na_2CO_3$ is held constant and the weight of $Ca(OH)_2$ varied to produce the required ratio of concentration.

TABLE I

| $Na_2CO_3$, g. | $Ca(OH)_2$, g. | Weight Ratio, $Na_2CO_3/Ca(OH)_2$ | Theoretical $Ca(OH)_2$ Required, g. | Excess $Ca(OH)_2$ Weight | Percent Excess $Ca(OH)_2$ |
|---|---|---|---|---|---|
| 185.1 | 154.5 | 1.20 | 129.8 | 24.7 | 19.3 |
| 185.1 | 148.3 | 1.25 | 129.8 | 18.5 | 14.25 |
| 185.1 | 142.5 | 1.30 | 129.8 | 12.7 | 9.78 |

The results of the improper weight ratio of the $Ca(OH)_2$ to $Na_2CO_3$ indicating a deficiency of $Ca(OH)_2$ is illustrated by the following example. The stoichiometric weight ratio of $Na_2CO_3$ to $Ca(OH)_2$ is 1.43. At this ratio the reaction is only 90% complete because of the tendency for the reaction to proceed in a reverse direction caused by the high ionization of NaOH. However, under the influence of variations in concentration and temperature, this reaction may proceed to a higher efficiency and from a theoretical standpoint a 1.43 ratio should be considered a maximum. When this weight ratio was increased to 1.458 the specific surface of the $CaCO_3$ was greatly reduced, which affected the filtering rate of the carbonate. Table II shows a comparison in the specific surface and the filtering rate of this carbonate compared to a carbonate produced at the same temperature at a ratio of 1.40, indicating the inferior quality of carbonate produced.

TABLE II

| Weight Ratio, $Na_2CO_3/Ca(OH)_2$ | Specific Surface, cm.²/g. | Cake Thickness, in. |
|---|---|---|
| 1.40 | 117,605 | 1¼ |
| 1.458 | 28,708 | ⅛ |

The development of a carbonate of the proper particle size or specific surface, produced by the causticization, is also influenced to a great extent by the weight ratio of total calculated solid materials, $Na_2CO_3$ plus $Ca(OH)_2$ to the total volume of the suspension. This is another way of expressing the weight ratio of calculated solids to liquid. It has been found that this weight ratio is as important as the weight ratio of $Na_2CO_3$ to $Ca(OH)_2$ in producing material of optimum or maximum specific surface. Very little consideration has been given to the ratio of solids to liquid in commercial warm causticizations, probably because the ratios are less sensitive or less applicable at high temperatures. However, reactions carried out at low temperatures, in accordance with the present invention, are much more sensitive to this ratio in developing a carbonate of maximum specific surface. The ratio of solids to liquid cannot in itself be attributed to controlling the specific surface but this ratio in definite combination with the weight ratio of $Na_2CO_3$ to $Ca(OH)_2$ with other defined conditions, produces a combination for explicitly controlling the specific surface.

The designation $R_1$ is used hereinafter for convenience in expressing the weight ratio of $Na_2CO_3$ to $Ca(OH)_2$ and $R_2$ is used for conveniently expressing the weight ratio of the total volume of suspension to the calculated weight of solids present. Maximum specific surfaces, with uniform particle size distribution, have been obtained, without a sacrifice in the quality of the NaOH produced, when $R_1$ ranges from 1.0 to 1.4 at the same time $R_2$ ranges from 5.1 to 5.8. Table III presents data to illustrate the influence of the ratio, when all other factors are controlled and the reactions were made at a $Na_2CO_3/Ca(OH)_2$ weight ratio of 1.2 and 1.0.

TABLE III

[Temperature 20° C.]

| $Ca(OH)_2$, wt. | $Na_2CO_3$, wt. | $R_1$ $\dfrac{Na_2CO_3}{Ca(OH)_2}$ | $Ca(OH)_2+$ $Na_2CO_3$, wt. | Total Vol. Suspension, ml. | $R_2$ Ratio, Total Vol. $Ca(OH)_2+$ $Na_2CO_3$ | Specific Surface, cm.²/g. |
|---|---|---|---|---|---|---|
| 77.8 | 93.5 | 1.2 | 171.3 | 1,040 | 6.06 | 63,106 |
| 194.5 | 233.5 | 1.2 | 428.0 | 2,120 | 4.95 | 85,404 |
| 171.6 | 206.0 | 1.2 | 377.6 | 2,058 | 5.45 | 113,868 |
| 154.0 | 184.9 | 1.2 | 338.9 | 1,800 | 5.31 | 113,968 |
| 75.4 | 75.4 | 1.0 | 150.8 | 845 | 5.6 | 113,611 |

Therefore, the weight ratio between the total volume of the suspension and the calculated solids as $Ca(OH)_2$ and $Na_2CO_3$ must be in the order of 5.1 to 5.8 in order to develop a product of maximum specific surface of uniform particle size.

The fineness of a calcium carbonate precipitate, produced in accordance with the invention, can also be controlled by regulating the temperature of the $Ca(OH)_2$ suspension and the $Na_2CO_3$ solution between 20° C. and 40° C. when all other factors are constant. The specific surface area of $CaCO_3$ produced varies inversely as the temperature of these chemicals vary, and can be produced in a range of 120,000 cm.²/g. to 35,000 cm.²/g. (Blaine) by controlling the process plus or minus 1° in this range.

The method of mixing the chemicals at any stipulated temperature must be executed by a prescribed procedure. While I have found that under certain additional somewhat impractical conditions a suspension of $Ca(OH)_2$ may be added to a solution of $Na_2CO_3$ to produce a carbonate with the novel desirable properties, it is clearly preferable that the solution of $Na_2CO_3$ be added to the suspension of $Ca(OH)_2$. It is important that the rate of adding these ingredients together or the method of mixing be closely governed to produce a stable pseudo-gel. The point of gelling is definite for each temperature between 20° C. and 40° C. and varies inversely in this temperature range. That is, causticizing at 20° C. produces a gel in approximately 25 minutes and causticization at 40° C. produces a gel in approximately 4 minutes. It is necessary that all $Na_2CO_3$ is introduced into the $Ca(OH)_2$ suspension before this gel point is reached. It is further desirable that all the $Na_2CO_3$ be introduced into the $Ca(OH)_2$ well before this point is reached. Consequently, the $Na_2CO_3$ may be added at one time, instantaneously, at the beginning of the process or it may be added in uniformly controlled rates. The ideal time for adding the $Na_2CO_3$ is estimated to be one-half the time required to reach the gel point. That is, at 20° C., the $Na_2CO_3$ should be added in approximately 12 to 15 minutes in order that the optimum degree of reaction may take place between the $Na_2CO_3$ and the $Ca(OH)_2$ before the gel time of approximately 25 minutes. The process as otherwise herein defined will result in failure where gelling takes place before all the $Na_2CO_3$ solution has been introduced. Any portion of the $Na_2CO_3$ solution not introduced into the $Ca(OH)_2$ before gelling does not enter into reaction and consequently, no physical or chemical reaction is obtained with this portion of the solution, destroying the uniform fine particle distribution of the product.

The particle size or the specific surface of $CaCO_3$ can be controlled very closely from approximately 35,000 cm.²/g. to more than 120,000 cm.²/g. at the foregoing concentrations, rates of addition and rates of agitation by controlling the temperature of both the $Ca(OH)_2$ suspension and the $Na_2CO_3$ solution. It has been found that the specific surface of precipitated $CaCO_3$ varies inversely as the temperature of causticizing. That is to say, a maximum specific surface is obtained at a causticizing temperature of 20° C. (68° F.) and the specific surface decreases at a given rate as the temperature is increased to 40° C. (104° F.).

Table IV and Figure 1 show the specific surface of $CaCO_3$ precipitates obtained in the temperature range of 20° C. to 40° C. where $R_1$ varied from 1.20 to 1.40. A combination of the ratio for $R_1$ and the temperatures within these ranges will therefore permit the production of $CaCO_3$ at a predetermined specific surface.

TABLE IV

[Specific surface (Blaine) of $CaCO_3$ produced from $Ca(OH)_2$ suspensions and $Na_2CO_3$ solutions at $R_1$ from 1.20 to 1.40. Causticized at temperatures from 20° C. to 40° C.]

| Ratio $R_1$ | Temperature, ° C. | | | | |
|---|---|---|---|---|---|
| | 20 | 25 | 30 | 35 | 40 |
| 1.20 | 111,693 | 101,942 | 74,696 | 52,330 | 42,940 |
| 1.25 | 110,377 | 92,796 | 63,586 | 47,883 | 38,474 |
| 1.30 | 109,034 | 88,694 | 60,072 | 47,341 | 38,233 |
| 1.35 | 103,096 | 85,772 | 56,341 | 45,335 | 36,287 |
| 1.40 | 100,485 | 88,844 | 56,104 | 40,481 | 34,255 |

Rate of agitation

The rate of agitation during the addition of the $Na_2CO_3$ solution to the $Ca(OH)_2$ suspension is the most important factor contributing to the formation of a gel of properly-sized $CaCO_3$ particles when the concentration and temperature of the reagents are held within the limits specified above. The agitation rate must be sufficient to keep the suspension of $Ca(OH)_2$ dispersed in the $Na_2CO_3$ solution so that particles of $Ca(OH)_2$ will not settle out. The agitation must not be great enough to cause severe turbulence. Excessive agitation accelerates the reaction between $Ca(OH)_2$ and $Na_2CO_3$ to form $CaCO_3$ and this condition promotes premature gelling. Premature gelling greatly reduces the specific surface, increases the particle diameter and slows the filter rate of the $CaCO_3$. This premature gelling can take place only when a small fraction of the $Na_2CO_3$ solution has been added to the suspension of $Ca(OH)_2$. The addition of the remainder of $Na_2CO_3$ does not produce further gelling in the desired normal manner nor does it influence the change in specific surface or particle size resulting from the premature gelling.

Experimental pigments have been produced in laboratory equipment consisting of three-liter, stainless steel containers 8" in diameter equipped with a standard two-arm, 45° pitch cross-stirrer operated by a variable speed motor-stirrer. The ideal speed permitted to produce a normal gel with the 8" container was found to be within the range of 70–185 r.p.m. and preferably 140 r.p.m. Larger vessels have been used in experimental laboratory and commercial equipment to make production quantities. Agitation with equivalent design but larger diameter stirrers has been found satisfactory so long as peripheral speed of stirrers is maintained in the order of from 140 to 390 feet per minute. The mathematical formula for determining the proper speed of all such larger stirrers is:

$$S_2 \text{ (r.p.m.)} = \frac{S_1 R_1}{R_2} \text{ or } = \frac{(140)(4)}{R_2} = \frac{560}{R_2}$$

where $S_1$, 140 r.p.m., is the stirrer speed used in the experimental vessel of radius, $R_1$, 4 inches, and $S_2$ is the stirrer speed to be used in a vessel having a radius, $R_2$, expressed in inches. This mathematical formula applies only for a stirring shaft with two cross-arm stirrers. When more than two cross arms are used the speed must be reduced below the calculated value to compensate for the increased turbulence. In conclusion, the agitation must be thorough but with controlled mild turbulence.

Commercial application of the process in an eleven foot tank at a speed of 9 r.p.m. has duplicated laboratory conditions. Speeds of 56 r.p.m., 36 r.p.m., 22 r.p.m. and 18 r.p.m. in the same commercial equipment with otherwise above defined methods of material addition, have resulted in failure of the process by premature gelling with the results indicated in Table V.

TABLE V.—INFLUENCE OF AGITATION SPEEDS WITH TWO-ARM CROSS-STIRRER

Lab. tests, 8" diameter Tank (with thorough controlled-mild turbulence obtained between 70–185 r.p.m.)]

| Stirrer Speed, r.p.m. | Gel Conditions | Time of Gelling, Min. | Specific Surface, cm.²/g. |
| --- | --- | --- | --- |
| 100 | Normal | 12 | 71,870 |
| 175 | do | 9 | 78,327 |
| 300 | Premature | 5 | 59,423 |

[Commercial plant tests, 11' diameter tank (with thorough controlled-mild turbulence obtained between 4¼–10½ r.p.m.)]

| | | | |
| --- | --- | --- | --- |
| 9 | Normal | 17 | 76,000 |
| 18 | Premature | 3 | 60,629 |
| 22 | do | 3 | 52,484 |
| 36 | do | 3 | 51,800 |
| 56 | do | 3 | 36,961 |

Gel formation

As discussed above under the heading "Causticization reaction," the gelling phenomenon occurs in accordance with the invention from about 4 minutes to about 25 minutes after initial mixing of the reactants, dependent on temperature. By maintaining a controlled mild turbulence during mixing, the first appearance of the gelling phenomenon may be readily observed around the periphery of the surface of the reacting mixture. On the first appearance of gel formation, agitation is stopped and the gel is allowed to form, resulting in a gel-like solidity of the entire mixture.

Analysis of the gelled material at successive periods of 0, 5, 10, 15, 30, 45, and 60 minutes and 24 hours after gel formation has shown that the causticization reaction proceeds very rapidly for about fifteen minutes at which time about 90% of the Na⁺ has converted from $Na_2CO_3$ to $NaOH_1$ and at which time the ultimate fine and uniform particle size of the $CaCO_3$ has been substantially achieved. Although the time thus required may vary somewhat from fifteen minutes with variation in reaction conditions, there has been found to be a point at approximately fifteen minutes whereat a relatively sharp change occurs in the rate of reaction, and after which only slight differences are found in the uniformity and size of $CaCO_3$ particles ultimately produced.

Fig. 2 shows graphically the specific surface of $CaCO_3$ produced relative to the time period which the gel is maintained after formation. The following data in Table VI, from which the graph of Fig. 2 was derived, was obtained by a process in accordance with the invention, wherein $R_1$ was 1.2, $R_2$ was 5.3 and the causticization was carried on at 20° C.

TABLE VI.—INFLUENCE OF GEL PERIOD ON $CaCO_3$ FINENESS

| Time | Specific Surface (Blaine), cm.²/gm. |
| --- | --- |
| 0 Min | 66,495 |
| 5 Min | 88,332 |
| 10 Min | 96,287 |
| 15 Min | 107,915 |
| 30 Min | 109,054 |
| 45 Min | 111,786 |
| 60 Min | 112,104 |
| 24 Hours | 111,007 |

Accordingly, it will be seen that a critical point in the process of the invention is reached after maintenance of the gel for about fifteen minutes, and further that an optimum product in accordance with the invention is produced by maintenance of the gel for at least about one hour. The gel period is terminated at the desired time by vigorous agitation and the processes of the invention are further conducted as discussed herebelow.

Filtration and washing $CaCO_3$ precipitates produced within the limits of all factors specified above consist of particles of uniform size of high specific surface capable of a high filter rate. Recausticizing at an elevated temperature (boiling) with $Na_2CO_3$ and refiltering of the precipitate results in poor filtering because of agglomeration. This disadvantage has been overcome by further controlling the processes as follows: The gelled product is resuspended with vigorous agitation and filtered by vacuum. A wash solution of $Na_2CO_3$ of 100 g.p.l. is introduced over the entire surface of the filtered precipitate immediately upon removal of the NaOH solution. When all the solution containing NaOH has been removed, this wash solution of $Na_2CO_3$ will react with the $Ca(OH)_2$ remaining in the precipitate, which was not originally causticized because of high ⁻OH concentration of the solution. The temperature of the wash $Na_2CO_3$ being approximately that of the causticizing temperature then produces $CaCO_3$ from any remaining $Ca(OH)_2$ of the same particle size as that originally made in the causticizing process. The high filtering rate then permits the excess $Na_2CO_3$ to be removed at a rapid rate to produce a $Na_2CO_3$-free and $Ca(OH)_2$-free $CaCO_3$.

The rate at which NaOH (white liquor) and water pass through a filter bed is a measure of the uniform high surface $CaCO_3$ produced by this process. The highest filtering rate has been obtained with $CaCO_3$ of the highest specific surface with a corresponding decrease in the filter rate with a decrease in specific surface. A very drastic decrease occurs on deviation of conditions beyond the scope of the present invention, as seen herebelow.

The filtering rate of $CaCO_3$ precipitates produced by this process has been determined with a standard Oliver-United test filter leaf as defined further above. The thickness of the filter cake picked up in a one minute interval and the volume of filtrate filtering through the cake were measured. The thickness of the filter cake corresponded proportionally to the quantity of white liquor filtered through the cake during the one minute test.

The thickness of the filter cakes obtained at temperatures from 20° C. to 40° C. and from 50° C. to 70° C. have been determined and correlated with the specific surface of the CaCO₃ produced. As a matter of comparison, like data is presented regarding suspensions produced by the process of the example of page 2 of the above cited Rafton Patent, 2,062,255. These values are shown in Table VII.

TABLE VII.—COMPARISON OF SPECIFIC SURFACE (BLAINE) AND THE FILTER RATE OF CaCO₃ PRECIPITATES ON A STANDARD OLIVER-UNITED TEST LEAF. PRECIPITATE COLLECTED IN 1 MINUTE AT A VACUUM OF 25″ Hg

| Causticizing Temperature, °C. | Specific Surface, cm.²/g. | Cake Thickness, in. | Cake Wt., gm. | Filtrate Vol., ml. |
|---|---|---|---|---|
| 20 (according to process of invention) | 122,635 | 15/16 | 808 | 590 |
|  | 106,244 | 15/32 | 790 | 570 |
| 25 (according to process of invention) | 88,844 | 1⅛ | 670 | 500 |
|  | 92,796 | 1 1/32 | 570 | 510 |
| 30 (according to process of invention) | 56,104 | 1 | 480 | 470 |
|  | 74,676 | 13/32 | 505 | 485 |
| 35 (according to process of invention) | 40,481 | ¾ | 310 | 390 |
|  | 52,330 | 1 4/16 | 373 | 414 |
| 40 (according to process of invention) | 34,255 | ⅝ | 235 | 298 |
|  | 42,940 | ¾ | 163 | 298 |
| 50 (But otherwise according to invention) | 19,201 | 13/32 | 117 | 274 |
| 60 (But otherwise according to invention) | 18,827 | 13/32 | 123 | 286 |
| 70 (But otherwise according to invention) | 18,591 | 5/16 | 89.3 | 219 |
| Rafton Patent Process | 60,047 | ¼ | 58.5 | 152 |

The choice of a temperature of the wash water following the Na₂CO₃ solution to remove the alkali is important in maintaining a high filtering rate. Commercial filtering operations suggest the use of hot water for the filtering operation which has been found to cause a shrinkage with a subsequent cracking of the filter cake during washing with an accompanying decrease in the filtering rate. The presence of cracks or crevices in the filter cake permits wash water to flow through without properly washing the cake and the shrinkage in the filter cake prolongs the filtering cycle. Wash water near or slightly above room temperature causes only a very slight shrinkage of the filter cake and as long as the surface of the cake is covered with water, no cracks or crevices occur to cause improper washing. Therefore, water at or near room temperature, in the order of 20° C. to 40° C., is used for washing the final filter cake to more effectively remove alkali from the precipitate without a decrease in the filtering rate and without the presence of crevices which would require prolonged washing.

Commercial application of process

The need for a more uniform CaCO₃, precipitate to be employed as a coating for certain high grade papers has prompted the commercial use of this process. It is realized that each type of paper pulp may require a CaCO₃ coating of a particular size particle to produce the desired results during printing. A preliminary investigation was undertaken on a commercial scale with laboratory samples of precipitated CaCO₃ of various specific surfaces, produced by this process, to determine the carbonate best suited for this particular paper. The results of this investigation led to the finding that a CaCO₃ having a specific surface in the order of 70,000 cm.²/g. best suited for permeability, the high grade paper of one particular manufacturer.

A plant scale batch test was made in which 3120 pounds of CaO were slaked in 3000 gallons of weak liquor, water containing 4 g.p.l. NaOH, and the resulting Ca(OH)₂ suspension was reacted with 5500 pounds of Na₂CO₃ in 3200 gallons of water. Causticizing was carried out at 25° C. in a tank 11′ in diameter and 11′ in height with a two-arm cross-stirrer operated at 56 r.p.m. As discussed further above, this speed caused premature gelling and ideal specific surface was not obtained. Tests were made at 36 r.p.m., 22 r.p.m. and 18 r.p.m., each producing premature gelling, resulting in a substandard carbonate requiring an excessive amount of adhesive for applying the carbonate to the paper and producing inferior gloss surfaced paper. A batch was produced at approximately 9 r.p.m. resulting in normal gelling in 17 minutes and producing CaCO₃ having a specific surface of 76,543 cm.²/g. The adhesive demand of this carbonate was very satisfactory and the gloss very high which produced an excellent coating for the particular example of high grade paper mentioned above.

The commercial production of carbonate under the limitations set forth above will produce a carbonate of desirable characteristics for paper coating. The control of specific surface at other temperatures offers the opportunity to produce carbonates to suit various other types of paper.

Conclusion

Data has been presented to show the reaction between Ca(OH)₂ suspensions and Na₂CO₃ solutions to be very complex but at the same time capable of being carried out under specified conditions to produce a CaCO₃ with a predetermined specific surface and having unusually uniform particle size distribution. The specific surface of the carbonate may vary from approximately 35,000 cm.²/g. to approximately 120,000 cm.²/g. to meet the needs of various industries as pulp and paper, cosmetic, paint and extenders. The specific surface of a carbonate may be controlled by maintaining a series of conditions governing the growth of Ca(OH)₂ crystals. The concentration of Ca(OH)₂, the concentration of Na₂CO₃ solutions, the weight ratio of water to the calculated solid materials present for the reaction, the temperature of the reaction and the rate of agitation all contribute to the successful production of a CaCO₃ of a specified specific surface. No single one of these conditions can be claimed to exclusively control this specific surface. It is a combination of these conditions contributing to the successful execution of the process.

Having completed a detailed disclosure of the preferred embodiments of my invention so that those skilled in the art may practice the same, I contemplate that variations may be made without departing from the essence of the invention or the scope of the appended claims.

I claim:

1. The method of making extra-fine CaCO₃ of uniform particle size, generally substantially below one micron, comprising the steps of admixing a solution of Na₂CO₃, having a temperature of from 20° to 40° C. with a suspension of fine Ca(OH)₂ having a temperature substantially equal to the temperature of said solution, said Ca(OH)₂ suspension having a concentration of from 175 to 194 grams per liter, the ratio of the weight of Na₂CO₃ to Ca(OH)₂ being from about 1.0:1.0 to about 1.40:1.0, completing said admixture prior to any gelling formation within the mixture of said solution and said suspension, said mixture having a total weight to solids weight ratio of from about 5.1:1.0 to about 5.8:1.0, thoroughly agitating said mixture with a controlled mild turbulence prior to said gelling formation, allowing said mixture to form completely to a gel, avoiding disrupting said gel for a period immediately thereafter of at least about fifteen minutes, disrupting said gel and forming a resuspension, and separating substantially completely by filtration the CaCO₃ fine precipitate and NaOH liquor reaction products of which said resuspension consists, whereby a superior filter cake of fine, uniform CaCO₃ is formed.

2. The method of making extra fine CaCO₃ of uniform particle size, generally substantially below one micron comprising the steps of adjusting the temperature of a suspension of from 175 to 194 grams per liter of fine Ca(OH)₂ at a temeprature between 20° C. and 40° C., adding thereto a solution of substantially saturated concentration of Na₂CO₃ free of Na₂CO₃·10H₂O having a solution temperature substantially equal to said suspension temperature, the ratio of the weight of Na₂CO₃ to Ca(OH)$_2$ being from about 1.0:1.0 to about 1.40:1.0, completing said admixture prior to any gelling formation within the mixture of said solution and said suspension, thoroughly agitating said mixture with a controlled, mild turbulence prior to said gelling formation, allowing said mixture to form completely to a gel, avoiding disrupting the gel formed by said mixture for a period of at least about fifteen minutes, thence disrupting said gel and forming a resuspension, and separating substantially completely by filtration CaCO$_3$ fine precipitate and NaOH liquor reaction products of which said resuspension consists, whereby a superior filter cake of fine, uniform CaCO$_3$ is formed.

3. The method of making extra fine CaCO$_3$ of uniform particle size generally substantially below one micron, comprising the steps of slaking CaO in an excess of water at approximately 100° C., thus providing a Ca(OH)$_2$ of relatively high specific surface, forming therefrom a Ca(OH)$_2$ suspension of from 175 to 194 grams per liter concentration, adjusting the temperature of said suspension at from 20° C. to 40° C., adding thereto a solution of Na$_2$CO$_3$ having a concentration of at least 200 grams per liter and a temperature substantially equal to said suspension temperature, the ratio of the weight of Na$_2$CO$_3$ to Ca(OH)$_2$ being from about 1.0:1.0 to about 1.40:1.0, completing said admixture prior to any gelling formation within the mixture of said solution and said suspension thoroughly agitating said mixture with a controlled mild turbulence prior to said gelling formation, allowing said mixture to form completely to a gel, avoiding disrupting the gel formed by said mixture for a period of at least about fifteen minutes, thence disrupting said gel and forming a resuspension, and separating susbtantially completely by filtration the CaCO$_3$ fine precipitate and NaOH liquor reaction products of which said resuspension consists, whereby a superior filter cake of fine, uniform CaCO$_3$ is formed.

4. The method of making extra fine CaCO$_3$ of uniform particle size, generally substantially below one micron, comprising the steps of adjusting the temperature of a suspension of from 175 to 194 grams per liter of fine Ca(OH)$_2$ at a temperature between 20° C. and 40° C., adding thereto a solution of Na$_2$CO$_3$ having a concentration of at least 200 grams per liter and a temperature substantially equal to said suspension temperature, the ratio of the weight of Na$_2$CO$_3$ to Ca(OH)$_2$ being from about 1.0:1.0 to about 1.40:1.0, completing said admixture prior to any gelling formation within the mixture of said solution and said suspension, thoroughly agitating said mixture with a controlled, mild turbulence prior to said gelling formation, allowing said mixture to form completely to a gel, avoiding disrupting the gel formed by said mixture for a period of at least about fifteen minutes, thence disrupting said gel and forming a resuspension, separating substantially completely by filtration the CaCO$_3$ fine precipitate and NaOH liquor reaction products of which said resuspension consists, whereby a superior filter cake of fine, uniform CaCO$_3$ is formed.

5. The method of claim 4 wherein the said avoiding disrupting the gel is for at least about one hour, whereby an optimum fine, uniform CaCO$_3$ is formed.

6. The method of claim 4 wherein the solution of Na$_2$CO$_3$ is added to the Ca(OH)$_2$ suspension in substantially one-half of the time required for producing a gel.

7. The method of claim 4 wherein said agitation is mantained at a substantially constant degree from the first addition of Na$_2$CO$_3$ at least until the first indication of gelling is apparent.

8. The method of claim 7 wherein agitation is produced by the rotation of a two-arm cross-stirrer at a peripheral speed of from 140 to 390 feet per minute.

9. The method of claim 8 wherein the solution of Na$_2$CO$_3$ is added to the Ca(OH)$_2$ suspension in substantially one-half of the time required for producing a gel.

10. The method of claim 4 wherein the filter cake producted therein is subsequently subjected to a second Na$_2$CO$_3$ solution having a temperature substantially equal to the temperatures of said first solution and said suspension and removing the remaining liquids, whereby the excess Ca(OH)$_2$ in said filter cake is converted to CaCO$_3$ of a uniform particle size substantially equal to the CaCO$_3$ originally formed and collected in said filter cake.

11. The method of claim 10 wherein said filter cake is subsequently washed with wash water having a temperature of from 20° C. to 40° C., whereby a rapid and complete washing may be had to provide a substantially pure CaCO$_3$ of highly uniform fine particle size.

12. The method of making substantially pure, fine CaCO$_3$ of uniform particle size, generally substantially below one micron, comprising the steps of adjusting the temperature of a suspension of from 175 to 194 grams per liter of fine Ca(OH)$_2$ at a temperature between 20° C. and 40° C., adding thereto a solution of Na$_2$CO$_3$ having a concentration of at least 200 grams per liter and a temperature substantially equal to said suspension temperature and an amount such that the weight ratio of said Na$_2$CO$_3$ to said Ca(OH)$_2$ is from about 1.0:1.0 to about 1.40:1.0, completing said addition of Na$_2$CO$_3$ solution in substantially one-half of the time required for producing a gel, thoroughly agitating said mixture with a controlled, mild turbulence during the time from said first addition of Na$_2$CO$_3$ until the formation of a gel occurs therein, producing said agitation by the rotation of a two-arm cross-stirrer having a peripheral speed of from 140 to 390 feet per minute, allowing said mixture to form completely to a gel, avoiding disrupting the gel formed by said mixture for a period of at least about fifteen minutes, thence disrupting said gel and forming a resuspension, separating substantially completely by filtration the CaCO$_3$ fine precipitate and NaOH liquor reaction products of which said resuspension consists, subjecting the filter cake produced by said filtration to a second Na$_2$CO$_3$ solution having a temperature substantially equal to the temperatures of said first solution and said suspension, and washing the filter cake with wash water having a temperature of from 20° to 40° C.

References Cited in the file of this patent

UNITED STATES PATENTS

| | | |
|---|---|---|
| 2,062,255 | Brooks et al. | Nov. 24, 1936 |
| 2,140,375 | Allen et al. | Dec. 13, 1938 |